April 14, 1959 F. R. ELDRIDGE, JR 2,881,623
VARIABLE SPEED TRANSMISSION
Filed Aug. 10, 1956 2 Sheets-Sheet 1

INVENTOR.
FRANK R. ELDRIDGE, JR.
BY
W. E. Thibodeau & A. W. Pew
ATTORNEYS.

April 14, 1959   F. R. ELDRIDGE, JR   2,881,623
VARIABLE SPEED TRANSMISSION
Filed Aug. 10, 1956   2 Sheets-Sheet 2

INVENTOR.
FRANK R. ELDRIDGE, JR.
BY
W. E. Thibodeau & A. W. Pew
ATTORNEYS

2,881,623

VARIABLE SPEED TRANSMISSION

Frank R. Eldridge, Jr., Santa Monica, Calif., assignor to the United States of America as represented by the Secretary of the Army Application August 10, 1956, Serial No. 603,465

1 Claim. (Cl. 74—198)

This invention relates to a variable speed transmission, and more particularly to a ball-disc transmission for use in analogue computer devices.

It is an object of this invention to provide a two-ball disc integrator having a pair of balls mounted in a carriage and adapted to be traversed across the face of a disc carried on an input shaft to transmit motion to a cylinder to impart motion to an output shaft.

It is another object of the invention to provide a rack and pinion mechanism to translate the ball carriage across the disc to vary the motion imparted to the cylinder.

It is another object of the invention to provide a two-ball disc integrator wherein the ball diameter is equal to one-half the cylinder diameter to produce maximum efficiency and life for a given weight.

It is still another object of the invention to provide means for loading the disc against the balls and cylinder.

Figure 1:
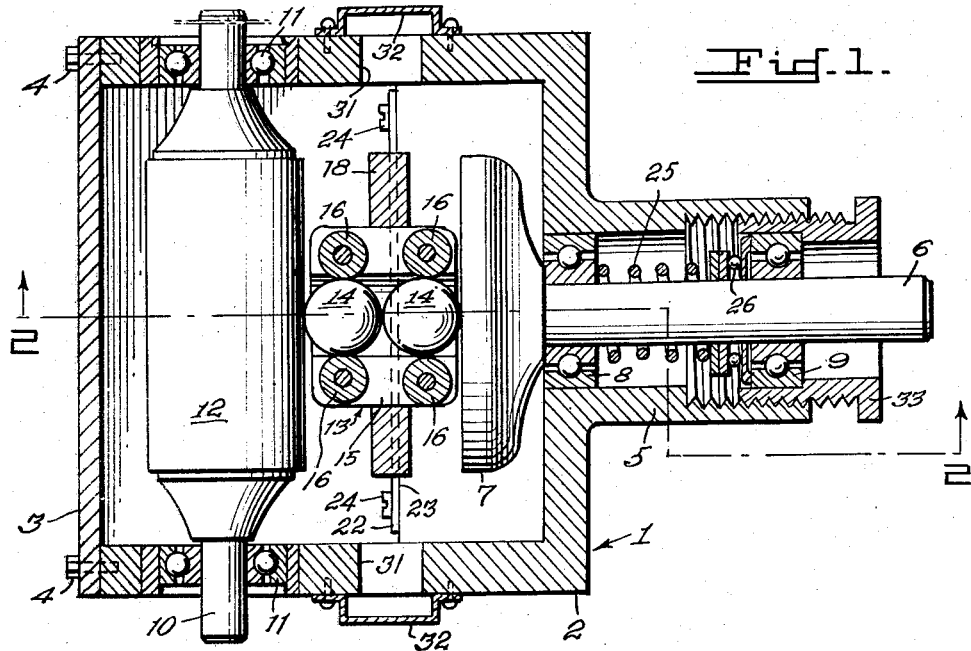
Figure 2:
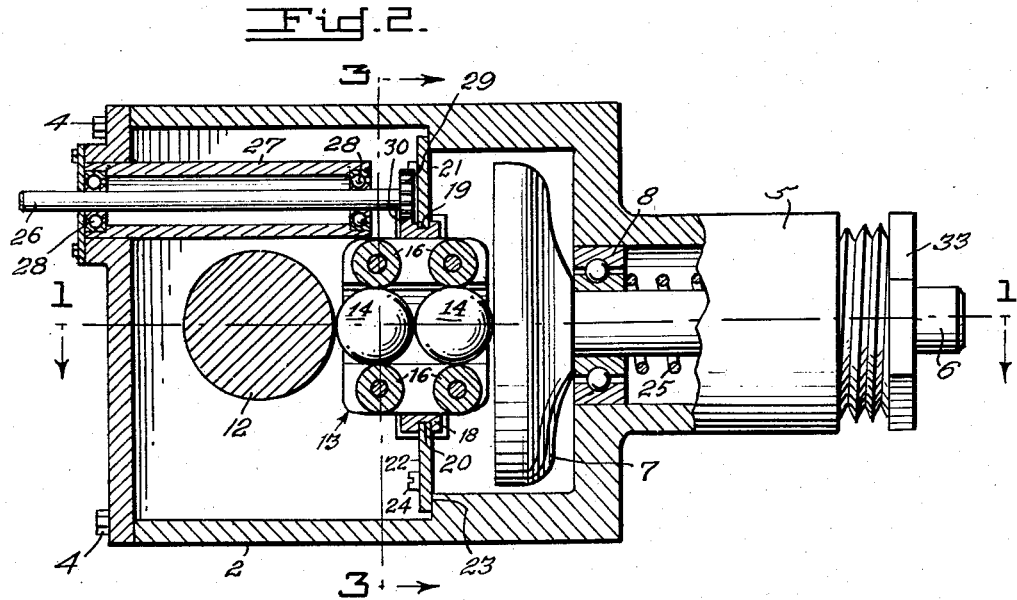
Figure 3:
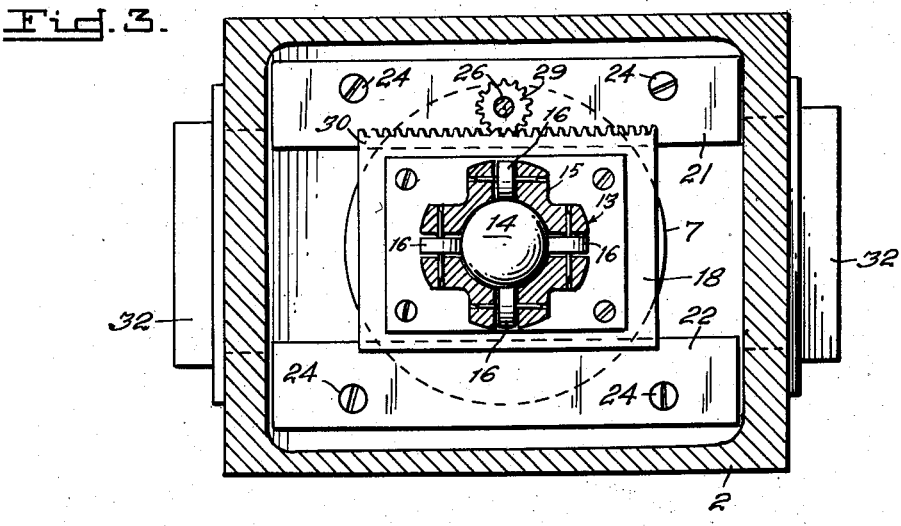
Figure 4:
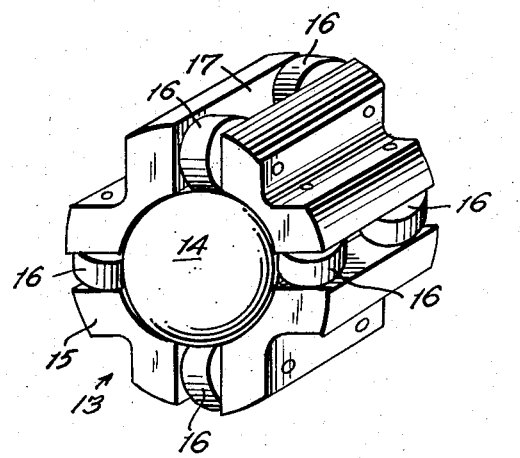

The specific nature of the invention as well as other objects and advantages thereof, will clearly appear from a description of a preferred embodiment as shown in the accompanying drawings in which:

Fig. 1 is a cross section taken along line 1—1 of Fig. 2 and looking in the direction of the arrows illustrating the transmission of the invention, Fig. 2 is a longitudinal sectional view taken along line 2—2 of Fig. 1 and looking in the direction of the arrows, Fig. 3 is a vertical sectional view taken along line 3—3 of Fig. 2, and looking in the direction of the arrows, and, Fig. 4 is a perspective of the ball-carriage assembly.

Referring more particularly to the drawing, wherein like reference characters designate like or corresponding parts throughout the different views, reference character 1 indicates generally, a variable speed transmission, constructed in accordance with the invention. The numeral 2 indicates a housing and 3 a cover adapted to be secured to housing 2 by bolts 4. Housing 2 is provided with a cylindrical extension 5. Axially journaled in this extension is an input shaft 6 defining at its inner end, a disc 7. Shaft 6 is supported in extension 5 by a pair of bearings 8 and 9. Shaft 6 is adapted to be driven by a constant speed motor, not shown.

An output shaft 10 is provided journaled in bearings 11 in housing 2 and is disposed in a plane of 90° to the input shaft 6 and is spaced rearwardly therefrom. Fixed to shaft 10 is a cylinder 12 for a purpose to be described later. Shaft 10 is adapted to accommodate various applications, such as units to be driven thereby.

Interposed between cylinder 12 and disc 7 there is provided a two-ball integrator assembly, generally indicated by 13 and comprises a pair of aligned balls 14 contained in a cruciformed ball carriage 15 formed of four segments forming ball races for balls 14. Axially spaced rollers 16 are journaled in spaces 17 between the segments of the ball carriage 15 formed in ball carriage 15. The integrator assembly 13 is secured within a plate 18. The upper and lower edges of plate 18 is grooved as at 19 and 20 respectively to receive upper tracks 21 and 22 respectively for slidable mounting thereon. Track members 21 and 22 are secured to the edge 23, provided by a reduced area formed in housing 2, by screws 24.

Disc 7 is spring biased against balls 14 and in turn, biasing the balls 14 against cylinder 12 by spring 25 disposed about shaft 6 and between bearing 8 and a thrust bearing 26, as seen in Fig. 1.

There is provided means for traversing the ball carriage 15 with respect to the diameter of disc 7 and the longitudinal axis of the cylinder, and consists of a shaft 26 journaled in a tubular housing 27 in bearings 28. A pinion 29 is carried by the inner end of shaft 26 and meshes with a rack 30 on the upper edge of plate 18. Shaft 26 is adaptive to be driven by hand or any other suitable means, not shown.

Means to afford full travel of the ball carriage carrying plate 18 in either direction is provided and consists of openings 31 in the side walls of housing 2 and are provided with cones 32.

Adjusting means to vary the spring load tension of disc 7 is provided by a bearing nut 33 threadably engaged to cylindrical extension 5.

Operation

Assuming that shaft 6 is being driven at a constant speed and disc 7 is loaded against balls 14 by spring 25, and balls 14 are in turn loaded against cylinder 12. As long as balls 14 are on the center line of shaft 6, no motion will be transmitted to the output shaft 10 by cylinder 12. By turning shaft 26, the pinion 29 will be turned in rack 30 and plate 18 will move along tracks 21 and 22 carrying with it the ball carriage and balls. As balls 14 move further away from the axis of shaft 6, the motion transmitted from disc 7 to cylinder 12 will be increased. If it be desired to reverse the motion of the output shaft 10, the movement of the plate 18 is reversed.

The diameter of balls 14 should be one half the diameter of cylinder 12 to insure maximum output torque for a two-ball integrator with a given distance between the cylinder center line and the disc face.

It is apparent that a variable speed transmission has been designed that will give maximum efficiency and long life.

While a preferred form of the invention has been shown and described, various modifications and substitutions of equivalents will occur to those skilled in the art after a study of the foregoing disclosure. Hence, the disclosures should be taken in an illustrative, rather than a limiting sense, and it is the desire and intention to reserve all modifications within the scope of the subjoined claim.

What is claimed is:

In a variable speed transmission, a housing defining a mechanism-receiving chamber and a hollow cylindrical extension integral thereon having an internally threaded outer end, a hollow cylindrical externally threaded adjusting nut threadably engaging said internally threaded outer end of said extension, a driving shaft axially journaled at its outer portion in a bearing carried by said nut and at its inner portion in a bearing in said extension, said driving shaft having its inner end extending into said chamber and defining a disc having a flat face, a driven shaft rotatably mounted in said chamber at right angles to said driving shaft and defining an enlarged cylinder along its medial portion, the axes of said driving shaft and said driven shaft lying in a common horizontal plane and in spaced relation to one another, a rectangular plate having a centrally disposed cruciformed opening, a ball carriage comprising a cruciformed assembly rigidly secured in said opening in said plate, said assembly comprising four L-shaped segments, each segment having a concave inner surface forming ball races, a pair of aligned balls housed in said races and rollers journaled between each said segments to retain said balls against radial movement, a pair of vertically spaced track members secured within said chamber and disposed medially of said cylinder and said disc, said plate having a grooved edge fitting between said track members and providing sliding means for said plate, means for moving said plate and said ball carriage along said tracks including a shaft rotatably mounted in said chamber provided with a pinion on its inner end, a rack carried by one edge of said plate and in mesh with said pinion and means urging said disc against said balls and said balls against said cylinder to transmit motion from said driving shaft to said driven shaft comprising an annular thrust bearing about said adjusting driving shaft and disposed adjacent said bearing in said nut and a coil spring encircling said driving shaft and biasing between said thrust bearing and said bearing in said cylindrical extension, the tension of said spring being adjusted by the turning of said adjusting nut.

References Cited in the file of this patent

UNITED STATES PATENTS

| | | |
|---|---|---|
| 1,317,915 | Ford | Oct. 7, 1919 |
| 2,602,338 | Opecensky et al. | July 8, 1952 |
| 2,687,043 | Umsted | Aug. 24, 1954 |
| 2,783,653 | Brown | Mar. 5, 1957 |